United States Patent

Uehara et al.

[11] Patent Number: 4,916,811
[45] Date of Patent: Apr. 17, 1990

[54] PROCESS AND APPARATUS FOR AUTOMATICALLY ATTACHING TERMINALS TO CABLE ENDS

[75] Inventors: Kenichiro Uehara; Toshio Nagasaka; Kohji Fujii, all of Osaka, Japan

[73] Assignee: Sumitomo Electric Industries Ltd., Osaka, Japan

[21] Appl. No.: 690,174

[22] Filed: Jan. 10, 1985

Related U.S. Application Data

[63] Continuation of Ser. No. 512,427, Jul. 11, 1983.

[30] Foreign Application Priority Data

| Jan. 22, 1983 | [JP] | Japan | 58-9681 |
| Jan. 22, 1983 | [JP] | Japan | 58-9682 |
| Jan. 22, 1983 | [JP] | Japan | 58-9683 |
| Feb. 10, 1983 | [JP] | Japan | 58-21880 |
| Feb. 10, 1983 | [JP] | Japan | 58-21881 |
| Feb. 10, 1983 | [JP] | Japan | 58-21882 |
| Apr. 15, 1983 | [JP] | Japan | 58-67629 |

[51] Int. Cl.$^4$ .................... H01R 43/04; B23P 19/00
[52] U.S. Cl. ............................ 29/863; 29/747; 29/564.4; 29/748; 81/9.51; 140/92.2; 242/7.09; 414/226
[58] Field of Search ................ 29/857, 861, 862, 863, 29/747, 748, 753, 754, 828, 564.4; 81/9.51; 198/648, 653, 695; 414/226; 242/7.09; 140/92.2

[56] References Cited

U.S. PATENT DOCUMENTS

| 1,396,033 | 11/1921 | Francis | 242/7.09 X |
| 2,927,679 | 3/1960 | Rively | 414/226 X |
| 3,204,334 | 9/1964 | Long et al. | |
| 3,283,398 | 11/1966 | Andren | 29/863 |
| 3,456,324 | 7/1969 | Hahn et al. | 29/747 X |
| 3,621,560 | 11/1971 | Le Bright | 29/828 |
| 3,686,752 | 8/1972 | Hammond | 29/862 |
| 3,703,954 | 11/1972 | Gudmestad | 198/695 |
| 3,768,143 | 10/1973 | Holmes, Jr. | |
| 3,875,662 | 4/1975 | Folk | |
| 3,909,900 | 10/1975 | Gudmestad | |
| 3,973,600 | 8/1976 | Choromokos | 140/92.2 X |
| 4,175,316 | 11/1979 | Gudmestad | 198/653 X |
| 4,440,053 | 4/1984 | Suzuki et al. | |

Primary Examiner—Carl J. Arbes
Attorney, Agent, or Firm—Harness, Dickey & Pierce

[57] ABSTRACT

Process and apparatus for automatically attaching a ferrule to each end of a cable such as an optical fiber cable are proposed. The cable is cut into suitable lengths and coiled for easy handling. All the steps are done automatically and the stripping and subsequent steps are done while the coiled cable loop laid down on a conveyor rack is conveyed intermittently from one station to another.

3 Claims, 23 Drawing Sheets

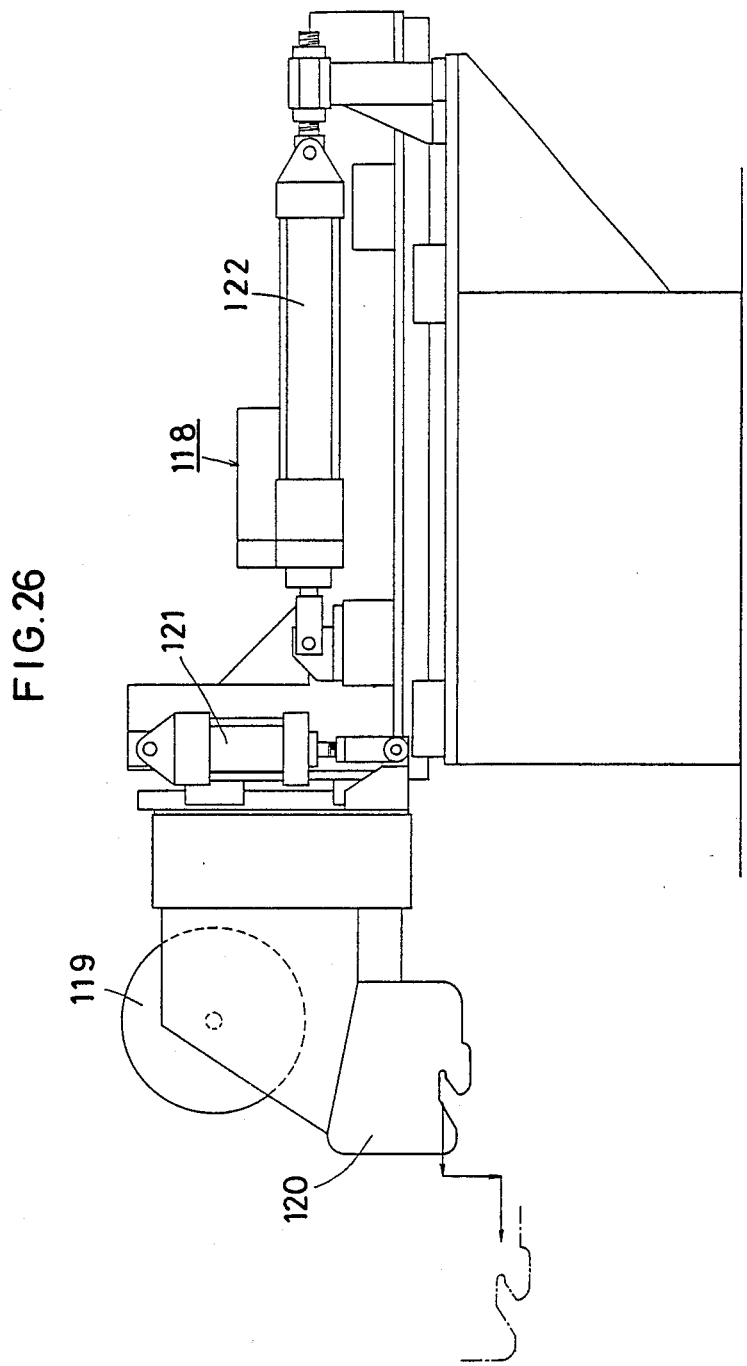

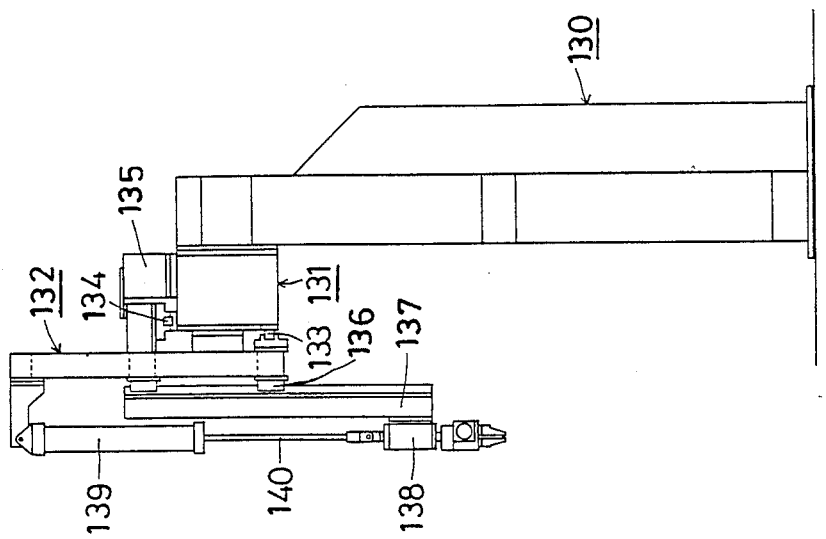
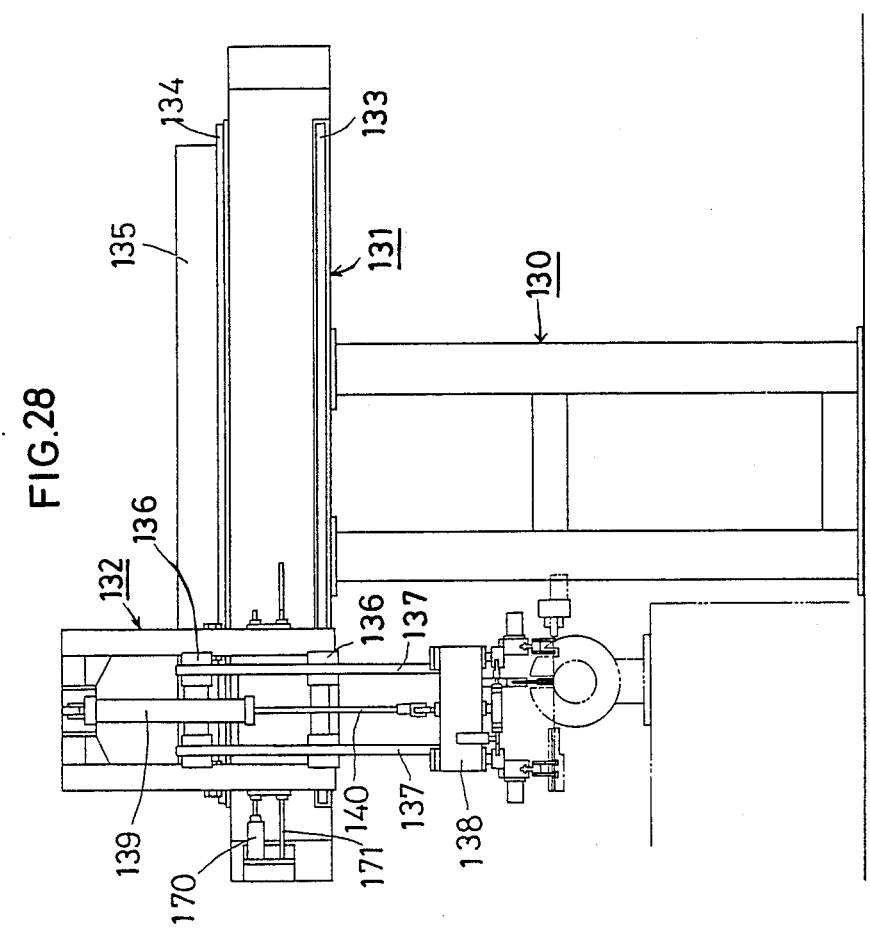

PROCESS AND APPARATUS FOR AUTOMATICALLY ATTACHING TERMINALS TO CABLE ENDS

This application is a continuation of application Ser. No. 512,427, filed Jul. 11, 1983.

The present invention relates to process and apparatus for automatically attaching a terminal to each end of a cable.

The work for attaching metal terminals (what is called the ferrule) to one or both ends of a cable such as an optical fiber cable includes the steps of cutting the cable from a supply drum into predetermined lengths, putting coil springs on the cable, stripping the sheath at the ends of the cable by means of a knife or a wire stripper, applying an adhesive to the sheath-stripped end, putting the ferrules on the cable, and clamping them on the cable. Up to now, these steps have been performed manually, though some of them were done by means of a processing machine.

FIG. 1 shows a conventional process in which a cable 2 drawn out of a supply drum 1 is cut into predetermined lengths by a cutter 3, and springs 7 are put on each of the cut pieces and ferrules 4 are attached to the ends of each cut piece.

FIG. 2 shows another conventional process in which springs 7 are put on the cables 2 cut to predetermined lengths and their ends are worked by means of processing machines 6 arranged near their ends while holding them at the points near their ends by means of chucks 5.

FIG. 3 shows a completed cable with the springs 7 and the ferrules 4 attached to their ends. The springs 7 serve to provide a coupling force between the ferrules 4 and female connectors.

Such conventional processes for attaching the ferrules to cables has a shortcoming that a sufficient work space for the length of the cable is required. If the cable is very long, it is troublesome to handle and the work efficiency and accuracy are low. Another problem is that the cable is apt to be under undue tension during the measurement of its length and other treatments.

An object of the present invention is to provide process and apparatus for automatically attaching a terminal to each end of a cable which obviates the abovementioned shortcomings.

Other features and objects of the present invention will become apparent from the following description taken with reference to the accompanying drawings, in which:

FIGS. 10 and 12 are plan views and FIGS. 11 and 13 are their corresponding front views, respectively;

FIGS. 14–19 are plan views;

FIG. 26 is a side view of a binding machine;

FIG. 28 is a front view of the transfer unit;

FIG. 29 is a side view thereof;

Figure 1:
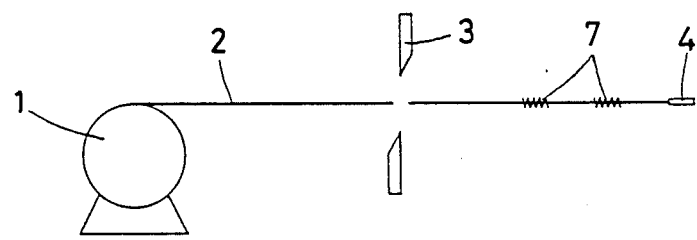
FIG. 1 is a schematic view showing a prior art process.
Figure 2:
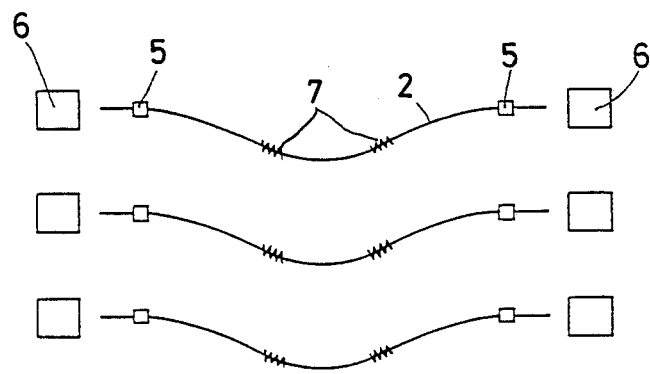
FIG. 2 is a schematic view showing another prior art process.
Figure 3:
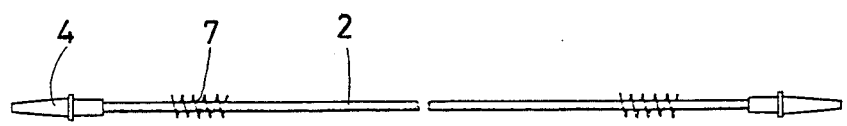
FIG. 3 is a partially cutaway front view of the completed cable with terminals mounted.
Figure 4:
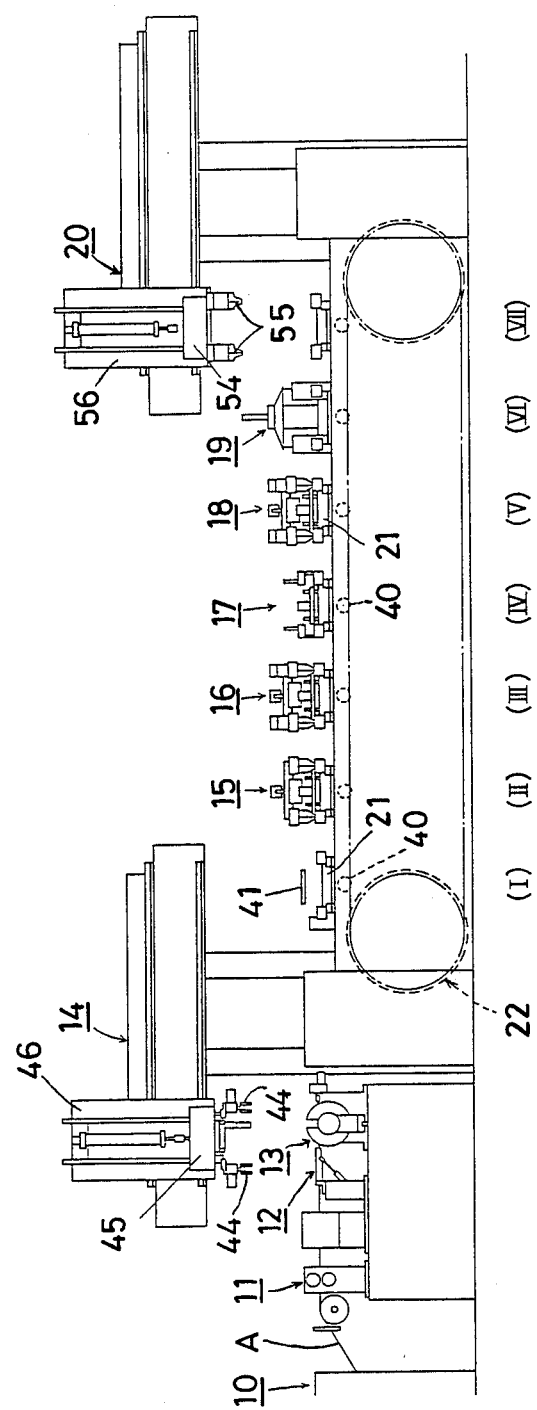
FIG. 4 is a front view of the entire apparatus according to the present invention.

Firstly, we shall describe the whole arrangement of the apparatus according to the present invention with reference to FIG. 4. From left to right in the figure, there are arranged a cable supply unit 10, a length measuring unit 11, a cutter/guide unit 12, a coiler 13, a first cable transfer unit 14, a stripper 15, a spring mounting unit 16, an adhesive applying unit 17, a ferrule mounting unit 18, a clamping unit 19, and a second cable transfer unit 20. Between the first and second transfer units there is provided a conveyor 22 having a plurality of conveyor racks 21 spaced therebetween. The conveyor moves the racks 21 intermittently from the first station I located under the first transfer unit 14 to the seventh station VII under the second transfer unit 20. The racks stop at each of the seven stations for some time and move to the next station.

On the apparatus according to the present invention, the cable A is cut into predetermined lengths and coiled by the coiler 13, the coiled cable being moved by the first transfer unit 14 to the rack 21 at the first station I and then moved to the subsequent stations intermittently. The sheath of the cable at one or both ends is stripped at the second station II; springs are put on the cable at the third station III; an adhesive is applied to the core of the cable at the fourth station IV; the ferrules are put on the cable and temporarily clamped at the fifth station V; they are fully clamped on the cable at the sixth station VI; and the cable with the ferrules is moved to the second transfer unit 20 at the seventh station VII.

Figure 5:
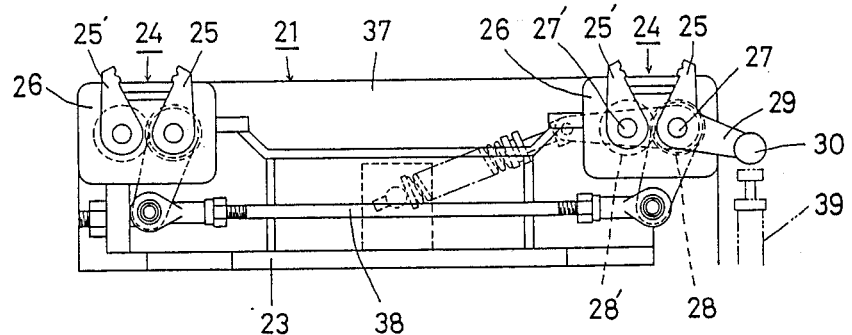
FIG. 5 is a rear view of the conveyor rack.
Figure 6:
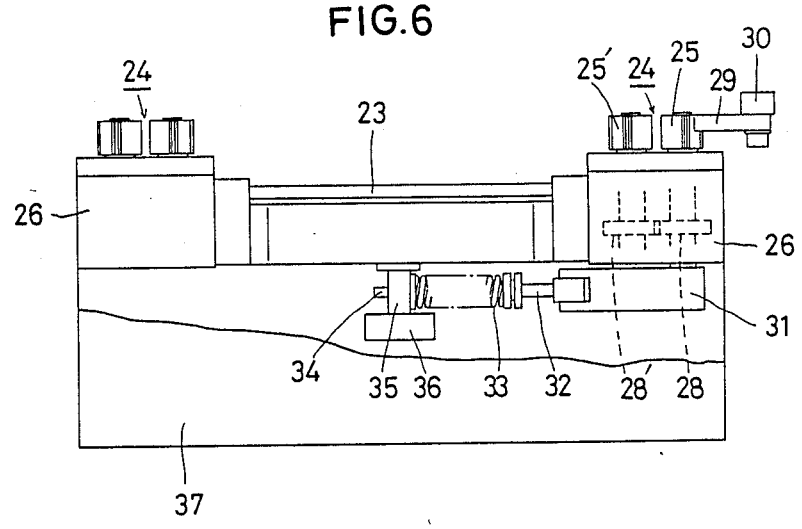
FIG. 6 is a plan view thereof.
Figure 7:
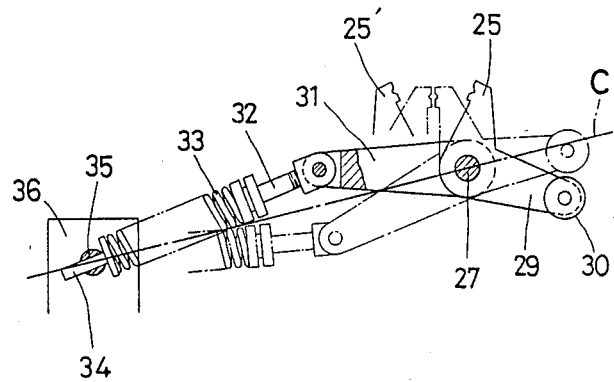
FIG. 7 is a partial sectional view thereof.
Figure 8:
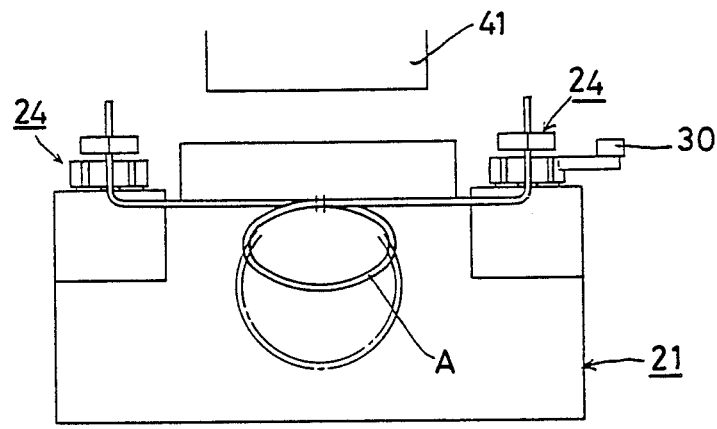
FIG. 8 is a plan view of the cable transfer unit.
Figure 9:
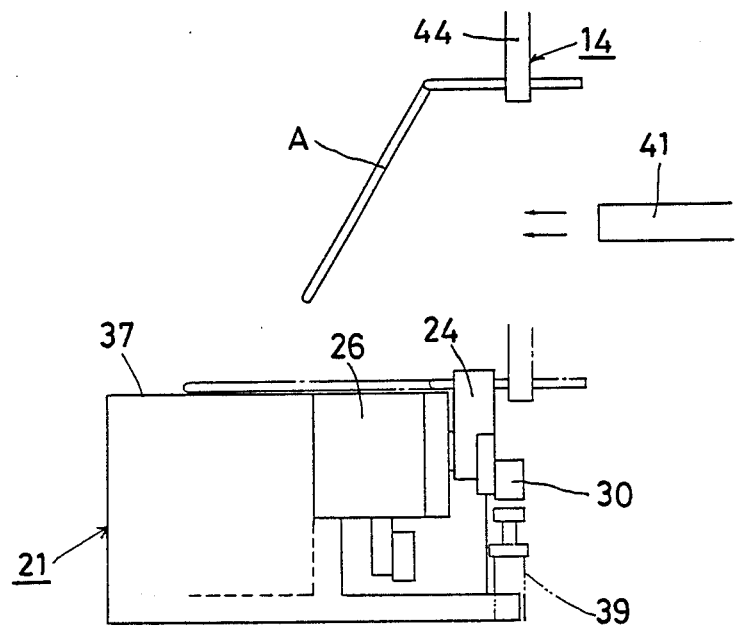
FIG. 9 is a side view thereof.
Figure 10:
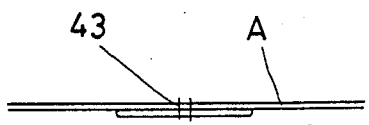
FIGS. 10–19 are views showing how the coiled cable is handled.
Figure 11:
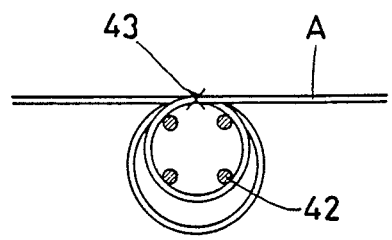
Figure 12:
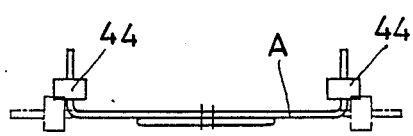
Figure 13:
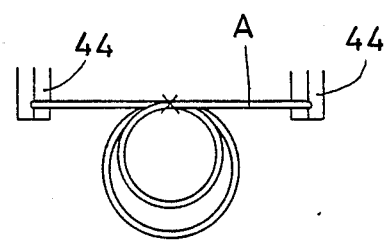

Referring to FIGS. 5–7, the conveyor rack 21 has a base plate 23 and a pair of chucks 24. The chucks have a pair of claws 25, 25' mounted on rotary shafts 27, 27' extending through gear boxes 26. Gears 28, 28' are fixedly mounted on the rotary shafts 27, 27' in engagement wit each other so that the claws 25, 25' will move toward and away from each other as these gears turn. The claws 25 of one chuck 24 are coupled to those of the other chuck through a coupling rod 38.

An arm 29 extends from one 25 of the claws of one chuck 24, said arm carrying a cam follower 30. A crank 31 is fixed on the other end of the rotary shaft 27 for the claw 25 with the arm 29 (FIGS. 6 and 7). A coupling rod 32 is pivoted to the tip of the crank 31. One end of a coil spring 33 is fixed to the coupling rod 32 and its other end is fixed to a coupling piece 34. The coil spring 33 is normally compressed between the coupling rod 32 and the coupling piece 34. The coupling piece 34 is coupled to a rotary shaft 35 which is supported on the base plate 23 through a bearing 36.

The crank 31 is fixed to the rotary shaft 27 at such a preset angle that it will sway up and down beyond a line C connecting the shaft 27 for the claw 25 with the shaft 35 for the coupling piece 34. A table 37 is fixed on top of each conveyor rack 21.

When an air cylinder 39 pushes up the cam follower 0, the claw 25 tilts back to a position shown by a dotted line in FIG. 7, and the other claw 25' tilts toward the claw 25. Thus, the chuck 24 is closed. At the same time, the other chuck 24, too, will be closed because two chucks are coupled by the coupling rod 38.

As the crank 31 sways beyond the line C, the coil spring 33 is compressed. The compressive force to the spring is at maximum when the crank is on the line C, and reduces gradually as the crank passes the line. Thus, the chuck 24 performs snap action imparted by the coil spring 33. In order to open or close the chuck 24, the arm 29 has to be pushed down or up through the cam follower 30 with a larger force than a certain level. In other words, the coil spring 33 imparts a clamping force to the chuck 24 and puts a limitation to free opening and closing of the chuck.

The conveyor racks 21 are coupled to the conveyor 22 through a coupler 40 (FIG. 4). They are adapted to move from station to station.

Over the first station I there is a nozzle 41 adapted to jet compressed air outwardly and in a direction normal to the direction in which the cable is conveyed. As the cable loop is lowered from the first transfer unit 14 on to the table 37 on the conveyor rack 21 at the first station I, it is blown down by a current of compressed air from the nozzle 41 so that it will fall down on the table 37.

During the lowering of the cable loop, its ends will fit in the chucks 24 of the conveyor rack 21 which are in an open state. When the transfer unit 14 has finished its lowering, the air cylinder 39 will operate to push up the cam follower 30, closing the chucks 24. Simultaneously, the other chuck coupled thereto will be closed.

Referring to FIGS. 10–19, it will be described how the cable is handled with the apparatus according to the present invention.

Figure 14:
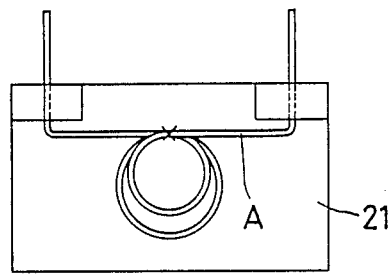
Figure 15:
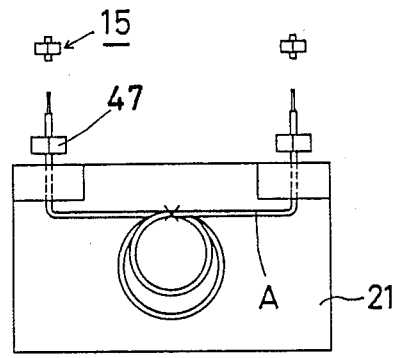

The cable cut to a predetermined length is coiled around pins 42 and bound with a cord 43 to keep it coiled. (FIGS. 10, 11) The coiled cable loop A is caught by chucks 44 of the first transfer unit 14 and taken out of the coiler 13. The chucks 44 are provided on a lift 45 of the first transfer unit 14 and are adapted to turn in a horizontal plane. They turn inwardly by 90 degrees after their ascent so that the ends of the cable loop will be bent by the same angle inwardly. The lift 45 is mounted on a horizontal slide 46. When the slide 46 comes over the first station I, the lift 45 will go down to pass the cable loop on to a conveyor rack 21 which is on stand-by at the first station. As described before, air is blown toward the cable loop during its descent so that the loop will rest on the table 37 on the conveyor rack 21. (FIG. 14)

Figure 16:
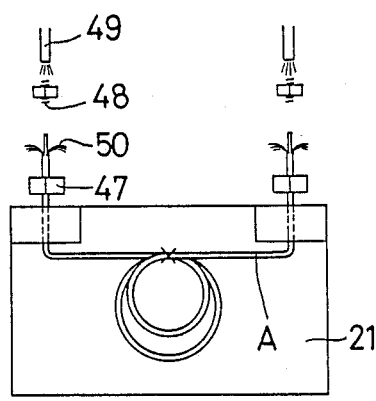

When the conveyor rack 21 moves to the second station II, the cable loop has its sheath stripped at both ends by the stripper 15 for a required length with its both ends held by a positioner 47. (FIG. 15) At the third station III, coil springs 48 are put on the ends of the cable loop by air current from the nozzle 49 and simultaneously a tension member 50 of the cable is spread out by the air current. (FIG. 16)

Figure 17:
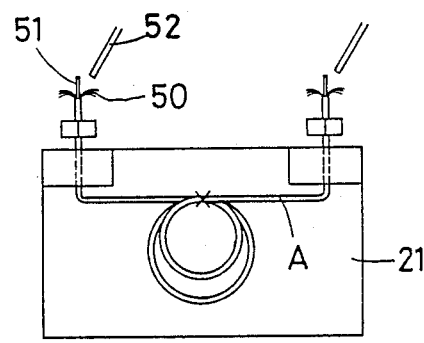

At the fourth station IV, the tension member 50 is pushed back with a suitable jig and an adhesive is applied to the exposed portion of the core 51 by means of adhesive nozzles 52. (FIG. 17)

Figure 18:
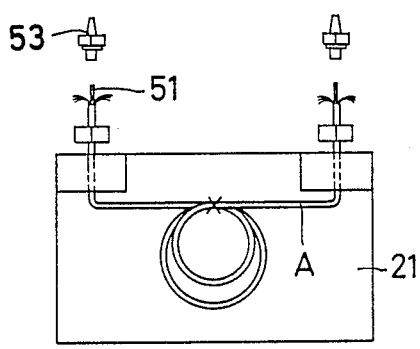
Figure 19:
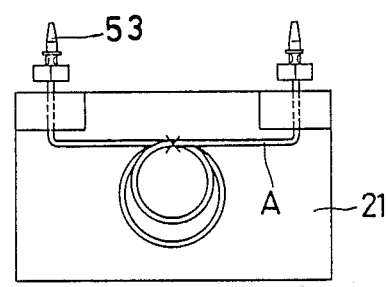

At the fifth station V, each ferrule 53 is put on the core 51 and over the tension member 50 and the sheath of cable. The ferrules are temporarily clamped on the cable by chucks to hold them in position. (FIG. 18)

At the sixth station VI, the ferrules are fully clamped against the cable (FIG. 19) At the seventh station VII, a lift 54 of the second transfer unit 20 (FIG. 4) will go down and catch the cable loop with the ferrules with its chucks 55. Then a horizontal slide 56 moves to take the cable loop out of the apparatus according to the present invention.

[COILER]

Next, we shall describe the coiler 13 with reference to FIGS. 20–27.

Figure 20:
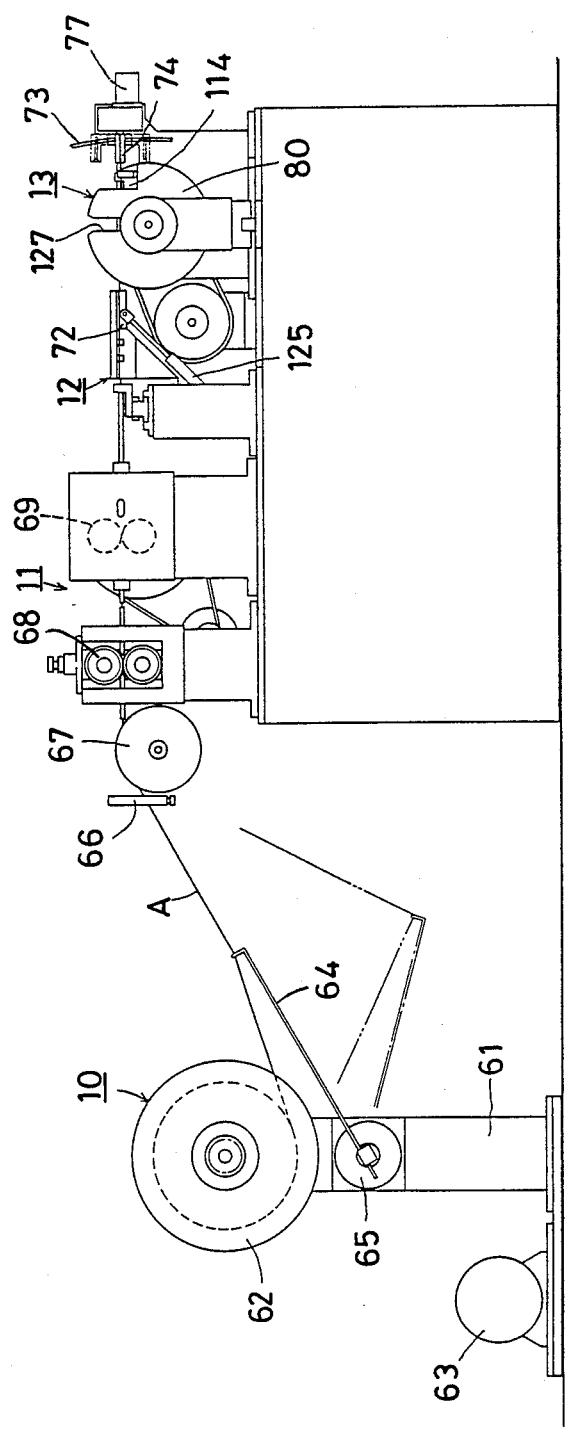
FIG. 20 is a partially enlarged front view of the apparatus according to the present invention.

As shown in FIG. 20, the cable supply unit 10 comprises a drum 62 rotatably supported on a frame 61, a drive 63 for the drum, a swing arm 64 and an angle detector 65 for detecting the angle of inclination of the cable A fed from the drum 62. The drum is rotated by a degree depending on the angle of the arm 64 oscillating in conformity with the slack of the cable so that the slack will be maintained above a predetermined amount.

The cable is fed by a required length by guide rollers 66, 67, 68 and a measuring roller 69 of the length measuring unit 11. The numeral 70 in FIG. 21 designates a drive for the length measuring unit. The forward end of the cable reaches the coiler 13 through a cutter 71 and a guide 72 of the cutter/guide unit 12 where it is inserted into a guide 74 of a forward end detection sensor 73 provided on the coiler 13. The numeral 75 in FIG. 21 designates an air cylinder for the cutter, 76 an air cylinder for the guide 72, 77 an air cylinder for the guide 74, and 78 a drive for the coiler 13.

Figure 22:
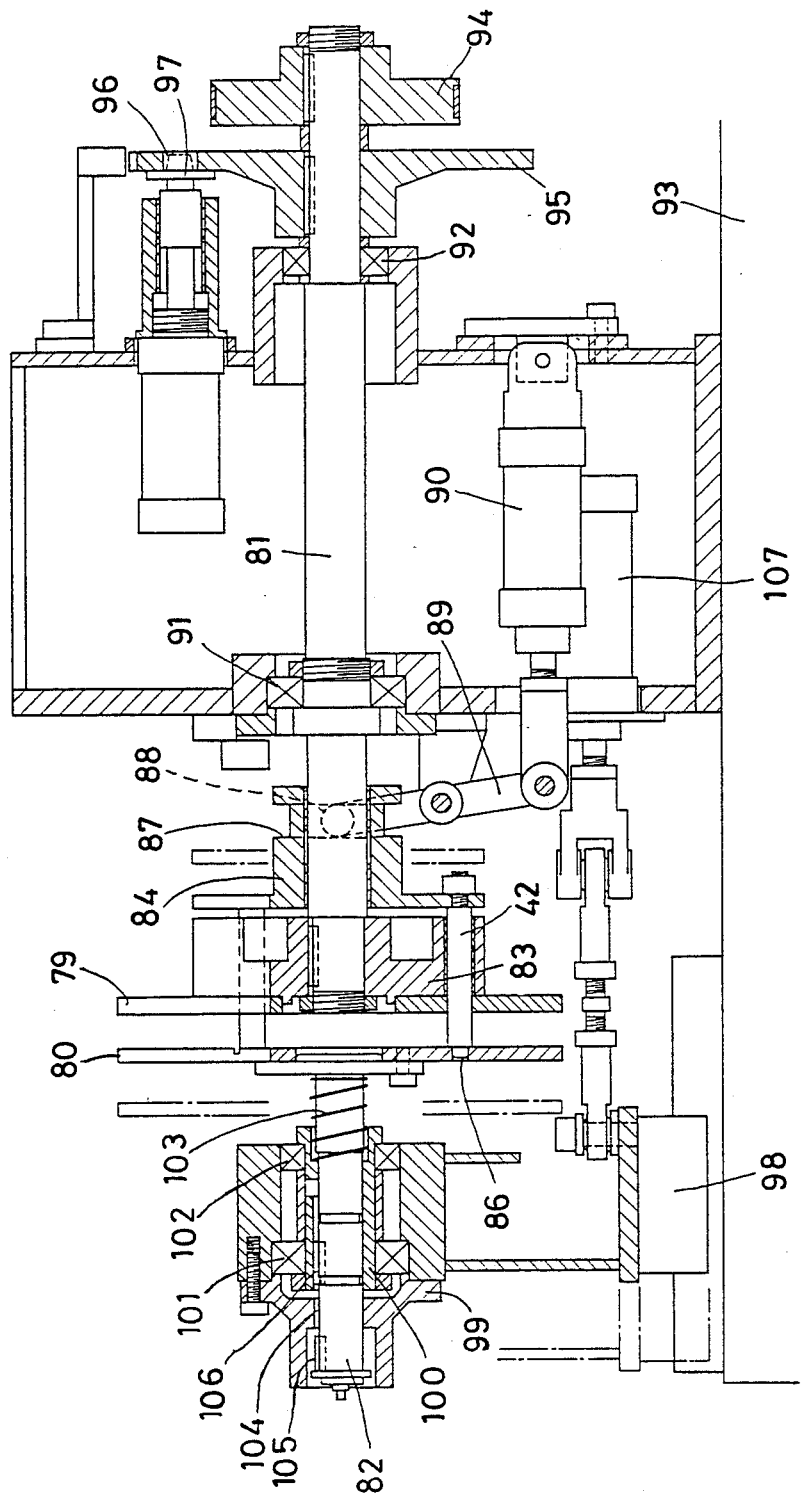
FIG. 22 is a sectional view of the coiler.

Referring to FIG. 22, the coiler 13 comprises an opposed pair of coiling disks 79, 80. The stationary disk 79 is supported on a horizontal rotary shaft 81 so as to rotate at a fixed position, while the other disk 80 is supported on a movable shaft 82 aligned with the rotary shaft 81 and adapted to move axially.

In the rear of a boss 83 of the stationary disk 79 there is fitted a slider 84 on the rotary shaft 81, four coiling pins 42 extending from the surface of the slider so as to encircle the rotary shaft 81. Each of the pins 42 extends through the stationary disk 79 and their small diameter portion at their tip is adapted to fit in a hole 86 provided in the movable disk 80. A roller 88 is fitted in an annular groove 87 provided in the slider 84, a lever 89 integral with the roller 88 being coupled to an air cylinder 90.

When the air cylinder 90 is actuated, the slider 84 slides until the forward end of each of the pins 42 into the corresponding hole 86 of the movable disk 80 so that the movable disk 80 will be detached from the stationary disk 79 so as to be ready for coiling.

The rotary shaft 81 is supported on a frame 93 through bearings 91, 92, the driving force of the drive 78 (FIG. 21) being transmitted to a gear 94 secured to the end of the rotary shaft 81 which is adapted to rotate an integral number of times. The rotary shaft 81 is provided with a disk 95. A knock pin 97 is adapted to fit into a hole 96 provided in the disk 95 to stop the rotary shaft 81 at an exact position.

The movable shaft 82 is axially slidably fitted in a casing 99 integral with a slider 98 provided on the frame 93. It is rotatably supported by bearings 101, 102 with interposition of a sleeve 100. Between the sleeve 100 and the movable disk 80 there is a spring 103. Keys 105, 106 are provided on the rotary shaft 82 so as to fit in a key groove 104 provided in the inner periphery of the casing 99. The movable shaft 82 is free to rotate when these keys are not in the key groove 104, and its rotation is restrained when either of these keys are in the key groove. The slider 98 is actuated by an air cylinder 107.

Figure 23:
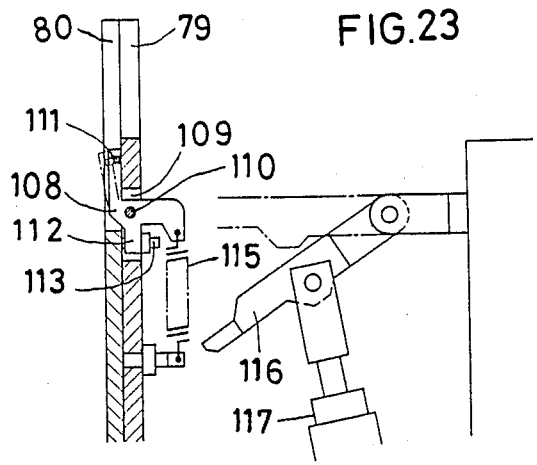
FIG. 23 is a sectional view of the chuck.

The stationary disk 79 is provided with a chuck 108 for the cable as shown in FIG. 23. The chuck is pivotally mounted on a pivot 110 in a hole 109 provided in the stationary disk 79. The front half of the chuck rises upwardly along the obverse of the disk 79, a recess 111 being provided at its forward end so as to face the disk 79. The rear half of the chuck projects rearwardly of the disk. A projection 112 is provided below the pivot 110. An adjusting screw 113 extends through the projection 112.

A notch 114 (FIG. 20) is provided in the movable disk 80 so as for the chuck 108 to pass. The front end of the adjusting screw 113 is adapted to engage the movable disk 80. A spring 115 is mounted between the rear end of the chuck 108 and the stationary disk 79 to urge the upper end of the chuck toward the stationary disk.

Figure 24:
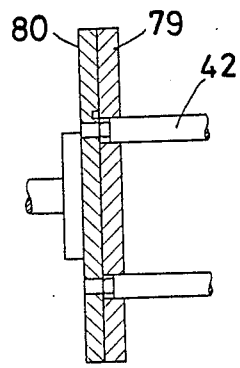
FIGS. 24 and 25 are plan views showing how the coiling plate operates.
Figure 25:
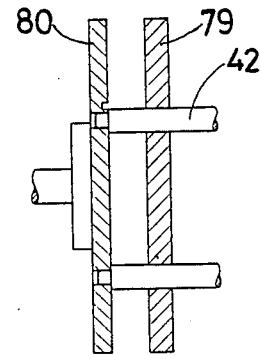

When the movable disk 80 is overlapped with the stationary disk 79 as shown in FIGS. 23 and 24, the front end of the adjusting screw 113 will engage the movable disk 80. Thus the upper end of the chuck 108 slightly detaches from the stationary disk 79 into such a half-open state as to permit the cable to fit in the recess 111. When the movable disk 80 is away from the stationary disk 79 as shown in FIG. 25, the chuck 108 forcibly restrains the cable.

Behind the stationary disk 79 there is provided a release lever 116 engageable with the rear end of the chuck 108. The release lever is actuated by an air cylinder 117. When the release lever engages the rear end of the chuck by the actuation of the air cylinder 117, the chuck 108 tilts into its full-open position as shown by dotted lines in FIG. 23 to release the cable.

Figure 27:
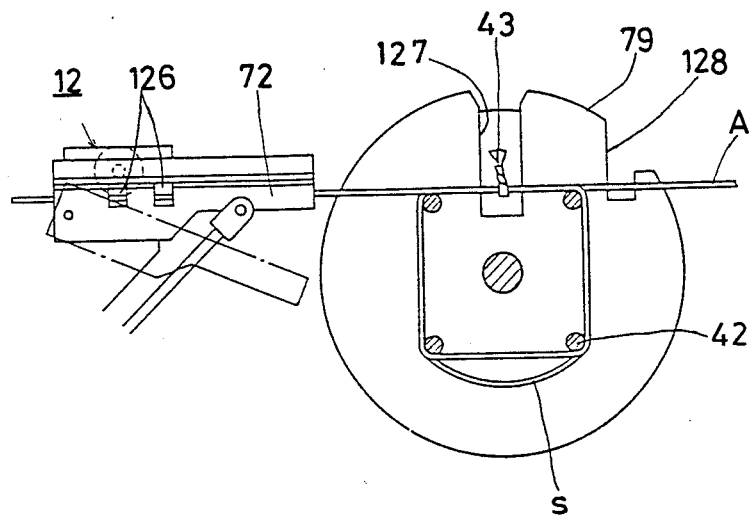
FIG. 27 is a front view showing how the coiled cable is found.

FIG. 26 shows a commercially available binding unit 118. It comprises a feed drum 119 for feeding a cord, a binding head 120, an air cylinder 121 for elevating the head 120 and an air cylinder 122 for moving it horizontally. The binding unit 118 is provided behind the coiler 13 as shown by dotted lines in FIG. 21. FIG. 27 shows the coiled cable bound with a cord 43.

The operation of the coiler 13 in the embodiment will be described below.

As shown in FIG. 20, the cable fed from the drum 62 of the cable supply unit 10 is measured by the measuring roller 69 and the leading end of the cable reaches the coiler 13. The stationary disk 79 and the movable disk 80 of the coiler 13 are overlapped. (FIGS. 23 and 24) Thus, there is a clearance sufficient to permit the passage of the cable A between the chuck 108 and the stationary disk 79. When the forward end of the cable reaches the sensor 73, the air cylinder 90 (FIG. 22) is actuated so that the front ends of the coiling pins 42 will fit in the respective holes 86 of the movable disk 80 to force the disk away from the disk 79.

When the movable disk 80 detaches from the stationary disk 79, the upper end of the chuck 108 is pressed against the stationary disk by the resiliance of the spring 115 to restrain the cable in the recess 111. Since the movable shaft 82 is also pressed back, the key 105 on the movable shaft 82 gets off the key groove 104. (FIG. 22)

Figure 21:
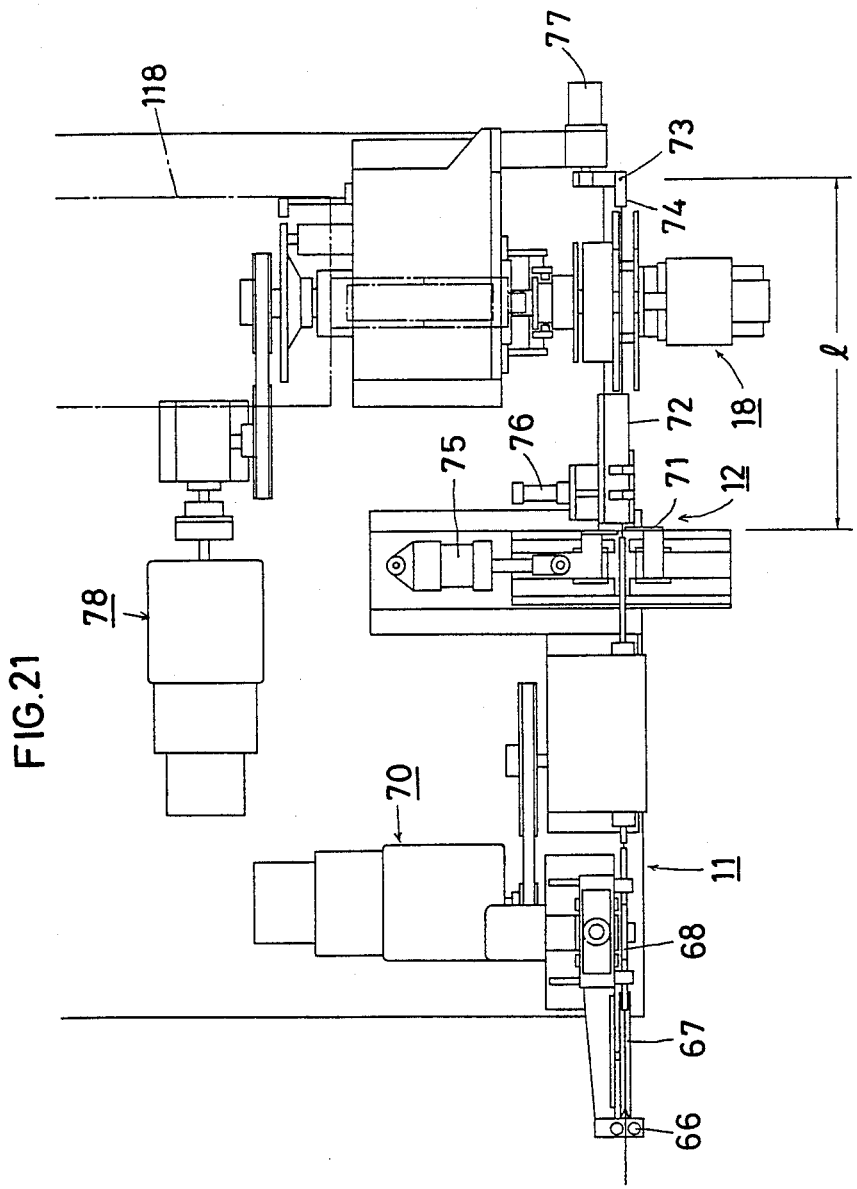
FIG. 21 is a plan view of a part of the apparatus.

When the rotary shaft 81 is rotated by the drive 78, the stationary disk 79, the movable disk 80 and the movable shaft 82 combined by the coiling pins 42 will rotate integrally so that the cable is wound round the four coiling pins 42 in cooperation with the feed/measuring unit 11 as shown in Fig. 21.

Though the front end of the cable has been fitted into the guide 74, both the disks 79, 80 can rotate for coiling without trouble since the guide is vertically divided, as shown by chain lines in FIG. 20, by means of the air cylinder 77 upon the rotation of the rotary shaft 81 so that the front end of the cable is released.

As described before, the rotary shaft 81 is adapted to rotate by an integral number, and the number of rotations is set in the following manner. Assuming that the coiling length per rotation is l the distance from the cutter 1 to the front end of the guide 74 is set to l (FIG. 21). The measured length of the cable is assumed to be $\chi$. The number of rotations N can be expressed as follows:

$$N = \frac{\chi}{l} - 1.$$

Any fractions below 1 are omitted. The guide 72 is adapted to guide the cable to the proximity of the coiling pins 42 to absorb any slack S (FIG. 27) of the cable around the coiling pins. Coiling is not effected if the measuring length $\chi$ is within the following range:

$$1 \leq \chi < 2l$$

When the coiling is through, the head 120 of the binding unit 118 advances as shown by arrows in FIG. 6 until it fits in the notch in the disks 79, 80. Thus the cable loop is bound with the cord as shown in FIG. 27 and the cable is cut off with the cutter 71.

Then the casing 99 is retreated by the air cylinder 107 to detach the movable disk 80 widely from the stationary disk 79 as shown by chain lines in FIG. 22. The coiling pins 42, too, are retracted by the air cylinders 90, 117, while the cable is released from the chuck 108. When the coiling pins 42 detach from the movable disk 80 with the retreat of the casing, the movable shaft 82 is slightly pushed forwardly by the spring 103, the key 105 engages the key groove 104, thereby checking the rotation of the shaft 82.

When the guide 72 of the cutter/guide unit 12 is retracted by an air cylinder 125, the cable, coiled and bound, is completely free for transfer to the next station by the first transfer unit 14 (FIG. 4).

As described above, the coiler comprises a stationary coiling disk and a movable coiling disk mounted on by respective horizontal rotary shafts. Since any slack of the cable droops by its own weight, the coiled cable can be tied without difficulty. In addition, the chuck can be in three positions, full-closed, half-open and full-open to permit secure coiling operation with precision.

In addition, the coiler is characterized in that the rotary shaft is rotated by an integral number. This makes stable the posture of the coiled cable for greater facility of its extraction and transfer.

The coiler 13 is provided with three recesses 126, 127 and 128 for receiving the chucks of the transfer unit 14.

[CABLE TRANSFER UNIT]

Next, we shall describe the cable transfer unit with reference to FIGS. 28–34.

As shown in FIGS. 28 and 29, the cable transfer unit includes a vertical frame 130, a lateral frame 131 secured thereto, and a movable frame 132 adapted to slide on the lateral frame. The movable frame is supported on guide rails 133 and 134 provided on the front side of the lateral frame 131, and is connected to the lateral frame through a sliding unit 135 pneumatically driven. The movable frame 132 is provided with two pairs of guide roller boxes 136, each pair of which allows a guide bar 137 to vertically fit therein. At the lower end of the guide bars is provided a bearing box 138 to which a piston rod 140 of an air cylinder 139 is connected so that the bearing box can move up and down.

Figure 30:
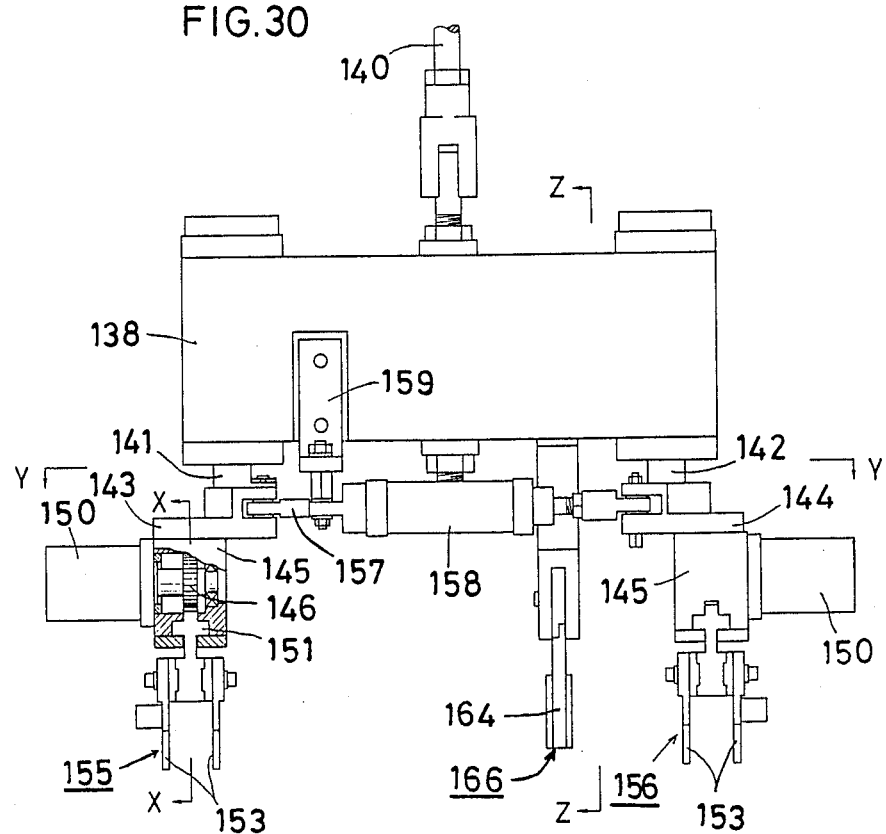
FIG. 30 is an enlarged front view of a portion of the transfer unit.
Figure 31:
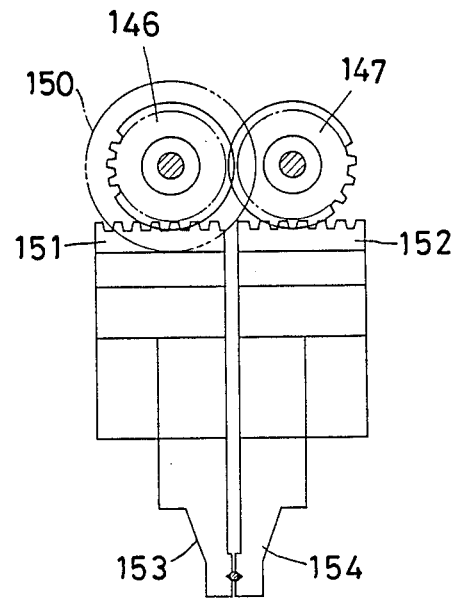
FIG. 31 is a sectional view taken along line X—X in FIG. 30.
Figure 32:
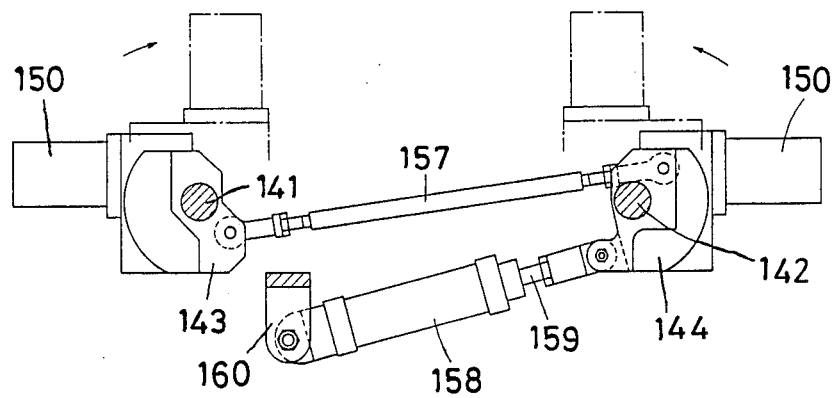
FIG. 32 is a sectional view taken along line Y—Y in FIG. 30.
Figure 33:
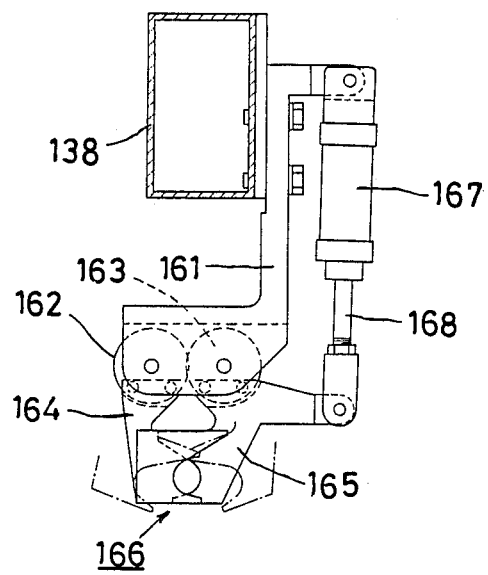
FIG. 33 is a sectional view taken along line Z—Z in FIG. 30.
Figure 34:
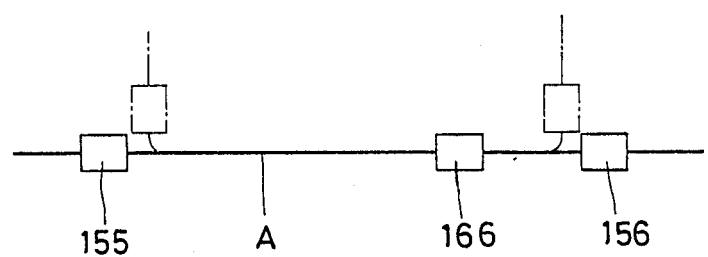
FIG. 34 is a view showing how the chucks turn.
Figure 35:
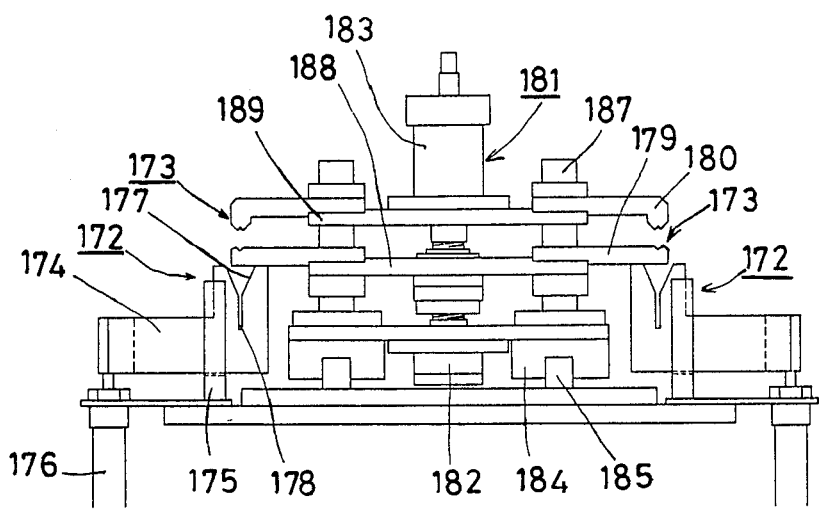
FIG. 35 is a front view of the cable end positioning unit.

As shown in FIG. 30, rotary shafts 141 and 142 supported in the bearing box 138 carry levers 143 and 144, respectively, to each of which a gear box 145 is secured. In each gear box, a pair of gears 146 and 147 mesh (FIG. 31) and a rotary actuator 150 is secured to the shaft of one gear 146. Racks 151 and 152 provided with claws 153 and 154, respectively, mesh with the gears 146 and 147, respectively. Thus a first chuck 155 comprises two pairs of claws 153, 154 connected to one rotary shaft 141, while a second chuck 156 comprises two pairs of claws 153, 154 connected to the other rotary shaft 142.

The levers 143, 144 are coupled to each other by a rod 157. (FIG. 32) A piston rod 159 of an air cylinder 158 is coupled to one lever 144. The air cylinder 158 is secured to the bearing box 138 through a bracket 160.

When the air cylinder 158 is actuated, the lever 144 turns by 90° counterclockwise around the rotary shaft 142 and the lever 143 turns by 90° clockwise around the rotary shaft 141. Thus the first and second chucks 155, 156 also turn by 90° similarly.

An L-shaped bracket 161 is secured to the bearing box 138, midway between the rotary shafts 141 and 142 and a little nearer to the latter. Gears 162, 163 meshing each other are rotatably mounted on the lower part of the bracket 161. A pair of claws 164, 165 are secured to each of the gears 162, 163 which constitute a third chuck 166. A piston rod 168 of an air cylinder 167 is pivotally connected to one claw 165. The air cylinder 167 is pivotally mounted on the upper end of the bracket 161. When it is actuated, the gears 162, 163 turn so as to move the claws 164, 165 away from and toward each other in a plane perpendicular to the cable.

The space between the first and third chucks 155 and 166 is set to the distance between the recesses 126 and 127, while the space between the third and second chucks 166 and 156 is set to the distance between the recesses, 127 and 128. The third chuck 166 may be omitted. The numerals 170 and 171 in FIG. 28 designate a damper and a stopper, respectively.

In operation, the movable frame 132 is moved by the sliding unit 135 until it comes to right over the coiler 13. Then the air cylinder 139 is actuated so as to move the bearing box 138 downwardly until the first, second and third chucks 155, 156 and 166 fit in the recesses 126, 128 and 127, respectively, in the coiler 13. Then the cable A comes to between the claws 153, 154 and between the claws 164, 165.

When the rotary actuators 150 and the air cylinder 167 are actuated, the chucks 155, 156 and 166 are closed so that the cable is gripped. While moving the bearing box 138 upwardly by actuating the air cylinder 139, the air cylinder 158 is actuated so as to turn the levers 143 and 144 by 90° so that the first and second chucks 155, 156 move to the positions shown in FIG. 34 by dotted lines so as to bend both ends of the cable by 90° and bring the cable to the shape of a capital U. The end portions of the cable are then processed, and the ferrules are fitted thereon.

The transfer unit used in the present invention has an advantage that the time required for the transfer of a cable loop can be reduced. This is derived from its simple construction and from the fact that the first and second chucks can be turned by a single air cylinder actuated while moving the chucks.

[CABLE END POSITIONING UNIT]

The stripper 15, spring mounting unit 16, adhesive applying unit 17, and ferrule mounting unit 18 are provided with a cable end positioning unit which serves to place and keep the ends of the cable loop in correct position for easy processing.

Next, we shall describe the cable end positioning unit with reference to FIGS. 35–38.

The positioning unit is provided with a pair of lateral positioners 172 and a pair of vertical positioners 173, which are symmetrically disposed about the axis of the unit.

Each of the lateral positioners 172 includes a positioning plate 174, a guide member 175 therefor, and an air cylinder 176 for moving the positioning plate up and down. The positioning plate 174 is formed with a V-shaped guide slot 177 with a vertical positioning slot 178 extending downwardly from its lower end.

Each of the vertical positioners 173 is disposed in front of the lateral positioner 172 (FIG. 36) and includes a lower claw 179, an upper claw 180 and a clamp drive 181. Each claw has a notch in alignment with a slot 178 of the positioning plate 174.

Figure 37:
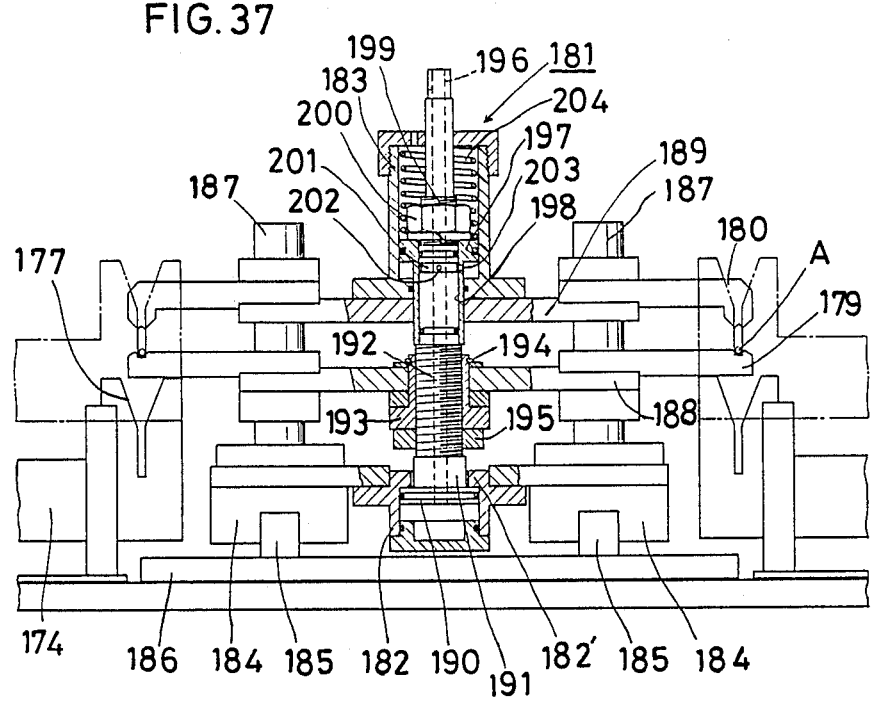
FIG. 37 is an enlarged sectional view thereof.

As shown in FIG. 37, the clamp drive 181 includes a lower cylinder 182 and an upper cylinder 183, the former being secured to sliders 184. The sliders are adapted to slide on guide rails 185 secured to a base plate 186. Guide poles 187 stand erect from each slider 184, and couplers 188 slidably fit in the guide poles 187, coupling the lower claws 179 and the upper claws 180 together.

In the lower cylinder 182, a piston 190 is provided. The piston rod 191 has a screw thread 192 cut on the portion projecting from the lower cylinder 182. A flanged sleeve 193 is tapped to engage with the screw thread 192 and extends through a hole provided in the center of the coupler 188. The hub of the coupler 188 is clamped between a retaining ring 194 fitted on the upper end of the flanged sleeve 193 and the flange of the flanged sleeve. A nut 195 prevents the flanged sleeve 193 from loosening. The lower cylinder 182 has at its top end a flange 182' for limiting upward movement of the piston 190.

The piston rod 191 extends upwardly through the coupler 189 and through the upper cylinder 183. The lower cylinder 182 can be supplied with compressed air through an air passage 196 provided axially through the piston rod 191.

A piston 197 with a tubular piston rod 198 extends through the upper cylinder 183. The piston rod 191 extends through the piston rod 198 and the piston 197. The lower end of the piston rod 198 abuts on the upper end of the screw thread 192. The piston rod 191 has a screw thread 199 cut upon the portion in the upper cylinder 183. A nut 200 is screwed on the screw thread 199 to hold the piston rods 191 and 198 together. The piston rod 191 has an annular groove 201 which communicates with the air passage 196 through a small hole 202 and with the interior of the upper cylinder 183 through a small hole 203 provided in the piston rod 198.

A spring 204 is mounted on the piston rod 191 in the upper cylinder 183 between the piston 197 and a cap nut screwed on the upper end of the upper cylinder 183.

Figure 36:
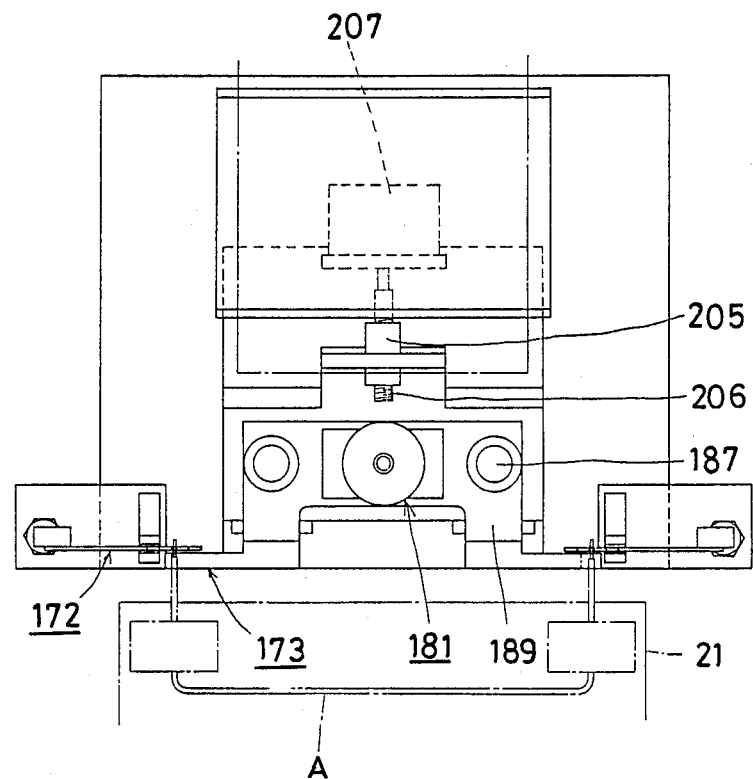
FIG. 36 is a plan view thereof.
Figure 38:
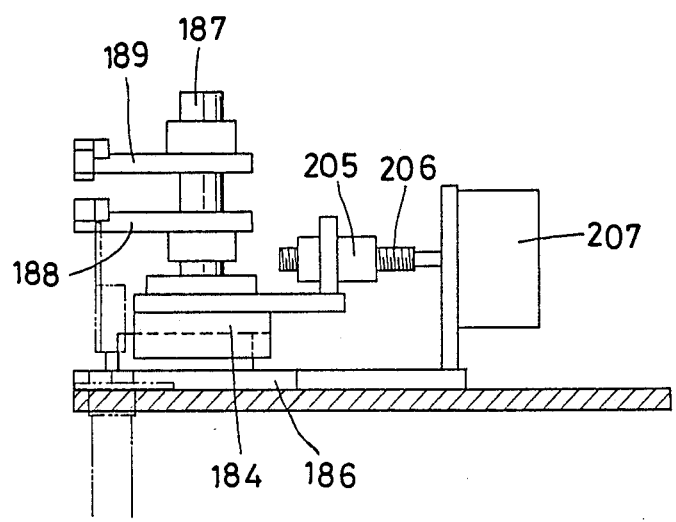
FIG. 38 is a side view thereof.
Figure 39:
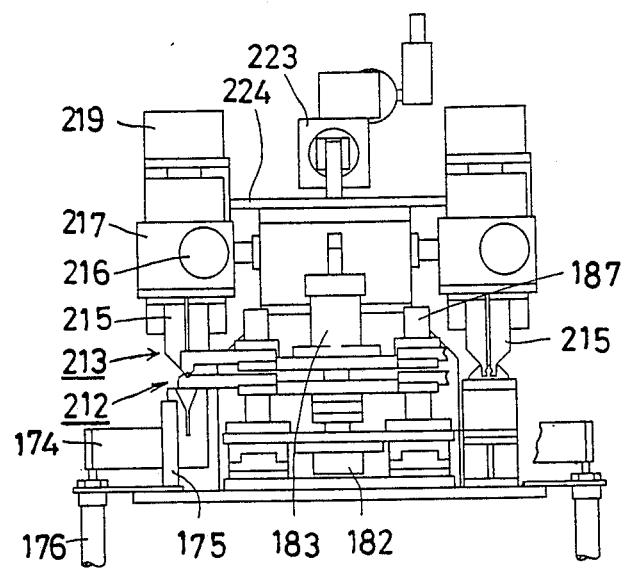
FIG. 39 is a front view of the spring mounting unit.

As shown in FIGS. 36 and 38, a tapped tube 205 is secured to the rear of the sliders 184. A threaded shaft 206 extends through the tube 205 and is coupled to the shaft of an air cylinder 207.

In operation of the cable end positioning unit, the conveyor rack 21 is advanced until it stops in front of the apparatus with both ends of the cable bent toward the apparatus as shown in FIG. 36. Then the air cylinder 207 is started so as to slide the slide 184 forwardly and thereby to move the whole positioning unit forwardly.

Both ends of the cable clear the notches provided in the ends of the lower claws 179 and are inserted into the V-shaped guide slots 177 in the positioning plates 174. When the positioning plates are moved upwardly by the air cylinder 176, both ends of the cable are put into the positioning slot 178. They are now laterally positioned.

The pressure in the lower cylinder 182 is then raised by supplying compressed air from the top of the piston rod 191 through the air passage 196. The piston 190, piston rod 191 and lower claw 179 move upwardly when the pressure in the lower cylinder 182 comes up to a level exceeding the total weight of the parts supported by the piston rod 191. Then the piston 197 goes up and lifts the upper cylinder 183 and the upper claw 180 through the spring 204.

When the piston 190 butts the flange 182', upward motion of the piston rod 191 is stopped. The pressure of compressed air supplied to the interior of the upper cylinder 183 through the small holes 202 and 203 is raised until it exceeds the force of the spring 204. The upper cylinder 183 goes down while compressing the spring 204 until the upper claws 180 engage the lower claws 179 so as to hold both ends of the cable therebetween. The height of the lower claws 179 can be adjusted by loosening the nut 195 and turning the flanged sleeve 193.

With both ends of the cable held between the upper and lower claws, the sheath of the cable is stripped, springs are fitted on the cable, an adhesive is applied thereto, and ferrules are fitted thereon.

After both ends of the cable have been processed in this manner, the upper claws are moved away from the lower claws and the air cylinder 207 is reversed to retreat the apparatus to its original position.

The positioning unit used in the present invention allows both ends of the cable to be automatically positioned and held in their proper positions. The upper and lower claws are operated by two cylinders and a single piston rod. The upper claws are adapted to move downwardly only after both ends of the cable have been vertically positioned by the lower claws.

[SPRING MOUNTING UNIT]

Next, we shall describe the spring mounting unit 16 with reference to FIGS. 39–43.

It comprises three components, i.e., a cable end positioning unit 212, a pair of spring chucks 213, and a pair of spring mounting stations 214. Among them, the cable end positioning unit has been described with reference to FIGS. 35–37.

Figure 40:
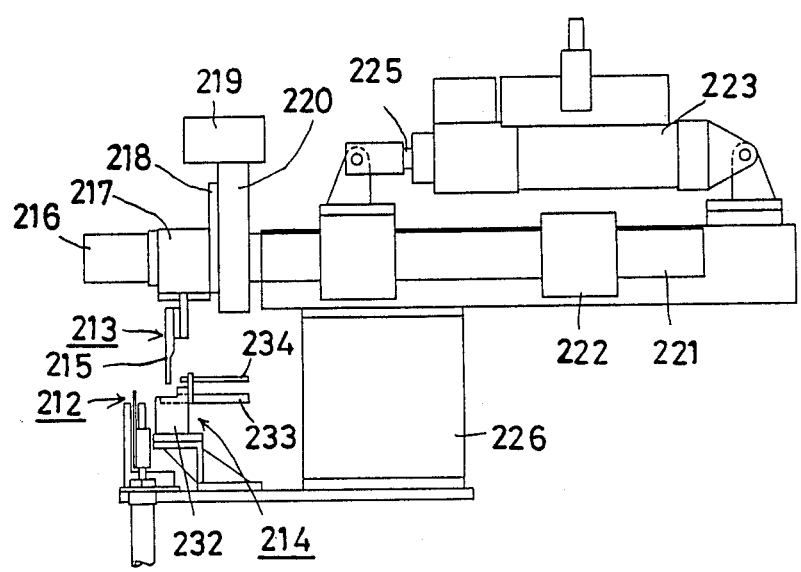
FIG. 40 is a side view thereof.
Figure 41:
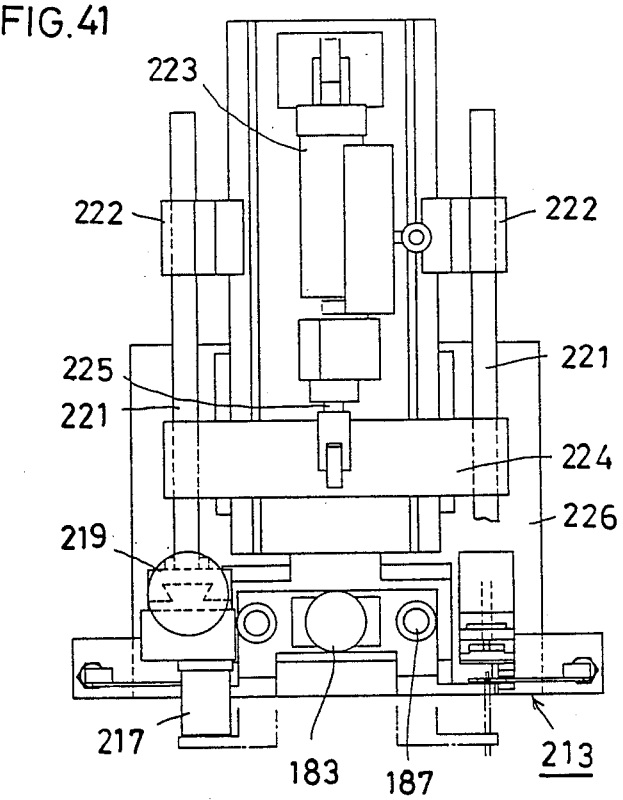
FIG. 41 is a plan view of a portion of the same.

The spring chuck units 213 are disposed behind the positioning unit 212 (on its right in FIG. 40). Each of the spring chuck unit 213 is provided with a pair of jaws 215. When an air cylinder 216 is actuated, gears are rotated in a gear box 217 so as to open and close the jaws 215 sideways in FIG. 39. The gear box 217 is mounted on a slider 218 adapted to be moved up and down by means of an air cylinder 219. The air cylinder 219 and a member 220 for supporting it are mounted on a slider 221 which is supported by a guide 222 so as to be moved back and forth (sideways in FIG. 40) by means of an air cylinder 223. As shown in FIG. 41, the sliders 221 are connected to each other by means of a coupler 224, and connected through the coupler to a piston rod 225 of the air cylinder 223. The guide member 222 and the air cylinder 223 are secured to a frame 226.

The spring mounting stations 214 are disposed under the spring chucks 213. Each of the spring mounting stations includes a spring mount 232 secured to the frame 226, a spring supply nozzle 233 and an air nozzle 234 on the spring mount 232, and a spring feeder (not shown) for automatically supplying springs one after another to the spring supply nozzle 233. Compressed air discharged from the air nozzle 234 serves to spread out the tension member of the cable and expose the cable core. After a spring has been fitted on the cable core, the compressed air forces the spring further.

In FIG. 4, both ends of the cable supported by the conveyor rack 21 are stripped of sheaths by the stripper 15. Then the cable is transferred to the spring mounting unit 16.

In the spring mounting unit 16, both ends of the cable are inserted in the V-shaped guide slots 177 provided in the positioning plates 174. Both ends of the cable are laterally and vertically positioned in such a manner as mentioned before.

Figure 42:
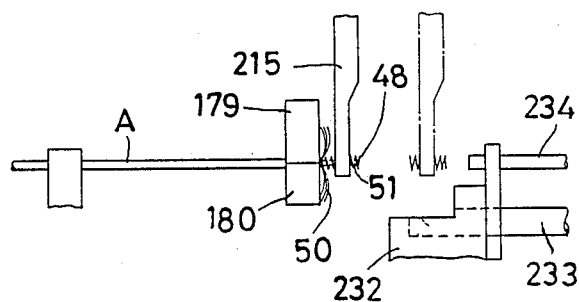
FIGS. 42 and 43 are views showing how the spring mounting unit operates.

When a spring is supplied to the spring mount 232 through the spring feed nozzle 233 (FIG. 40), the jaws 215 are opened by the air cylinder 216 and the gear box 217 and the jaws are moved downwardly by the air cylinder 219 so that the jaws 215 will take hold of the spring 48 (FIG. 42). When the jaws 215 holding the spring are raised by the air cylinder 219 and stopped in a position where the spring is aligned with the air nozzle 234 as well as with the end of the cable A held between the upper and lower claws 179 and 180.

Figure 43:
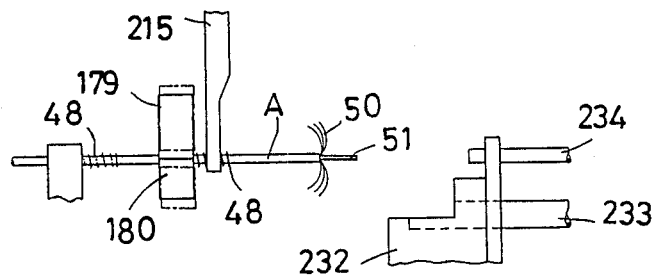

When compressed air is discharged from the air nozzle 234, the tension members 50 are spread out and the cable core 51 is exposed. The slider 218 is pushed forward by the air cylinder 219 so that the jaws 215 will be moved from the position shown by dotted line to the position shown by full line in FIG. 42. Then the spring 48 grasped by the jaws 215 is fitted on the cable core 51. The jaws 215 stop in this first position. Then the upper and lower claws 179 and 180 are detached from each other, and the air cylinder 158 is actuated so that the positioning unit 212 with the upper and lower claws 179 and 180 may be moved forward by a suitable distance and allowed to hold the cable again (FIG. 43). Then the adjustable jaws 215 grasping the spring 48 are moved to the second position where the upper and lower claws 179 and 180 are detached and the jaws 215 are opened. The spring is pushed to the phantom line position shown in FIG. 43 by compressed air, whereupon the third-stage insertion of the spring is completed.

When the mounting of the spring has been completed, the positioning unit 212 and the spring chuck units 213 are returned to their original conditions.

[ADHESIVE APPLYING UNIT]

Now, we shall describe the adhesive applying unit with reference to FIGS. 44–47.

Referring to FIG. 44, the cable is fed to the adhesive applying unit with its sheath partially stripped and its tension member 50 spread. (FIG. 44a) The adhesive applying unit is provided with guides 238 for folding back the tension member (FIG. 44b and 44c). Each guide has an opposed pair of guide pieces 239 which are formed in their front end with a recess 240 in alignment with a guide hole 241 and with a space 243 for receiving an adhesive nozzle 52.

Figure 44A:
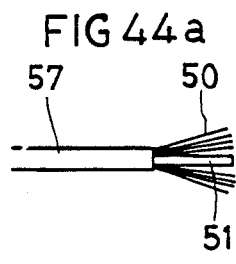
FIG. 44a–44f are views showing how the adhesive is applied.
Figure 44B:
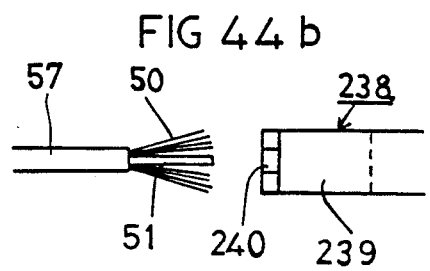
Figure 44C:
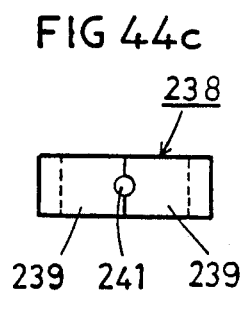
Figure 44D:
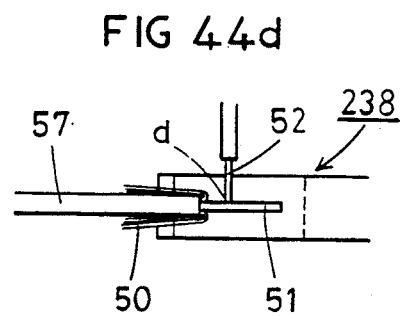
Figure 44E:
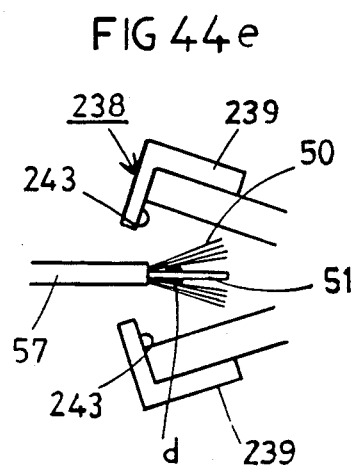
Figure 44F:
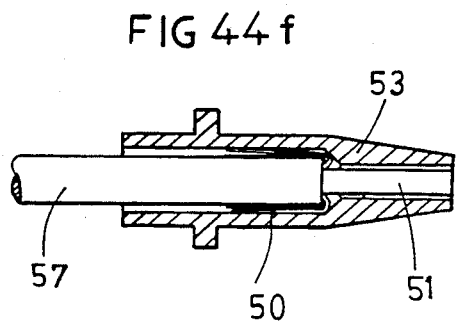
Figure 45:
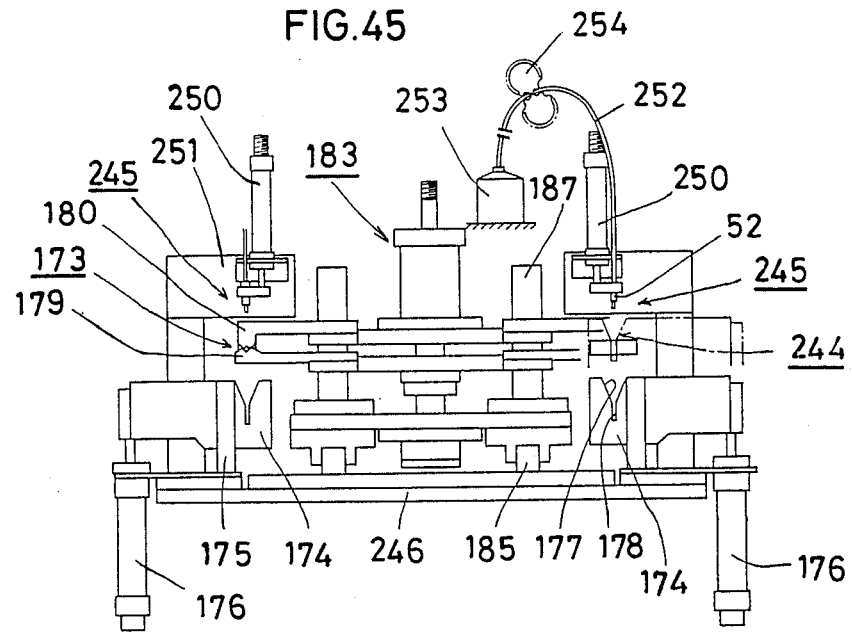
FIG. 45 is a front view of the adhesive applying unit.

When the guide 238 is advanced toward the cable end so as to introduce the core 51 into the guide hole 241, the tension member 50 is folded back so that the core 51 will be completely exposed. (FIG. 44d) The adhesive nozzle 52 is then lowered and applies an adhesive to the core 51. When the guide pieces are spread to release the cable end (FIG. 44e), the tension member 50 will get back to its original state by its own resilience. At the next station, the ferrule 53 is mounted on the adhesive-applied end of the cable as shown in FIG. 44f so that the ferrule will be brought together with the cable sheath, core and tension member with adhesive.

The adhesive applying unit comprises a cable end positioning portion 244 and an adhesive applying portion 245. The construction and operation of the former are the same as described before with reference to FIGS. 35–37.

The latter portion has an air cylinder 247 secured to a frame 246 and the guide 238 mounted on a piston rod 248. The guide is opened by the actuation of a small air cylinder 249 secured to the piston rod 248. The construction of the guide 238 has been described with reference to FIG. 44.

The latter portion also has an air cylinder 250 for elevating the adhesive nozzle 52. The air cylinder 250 is secured to a bracket 251. The adhesive nozzle 52 is connected to an adhesive tank 253 through a hose 252. The hose is provided with an adhesive feed ring 254 with which the adhesive is supplied for a required time by a required amount.

At the adhesive applying unit 17, the ends of the coiled cable are first positioned in both lateral and vertical directions as described before with reference to FIGS. 35–37.

Figure 46:
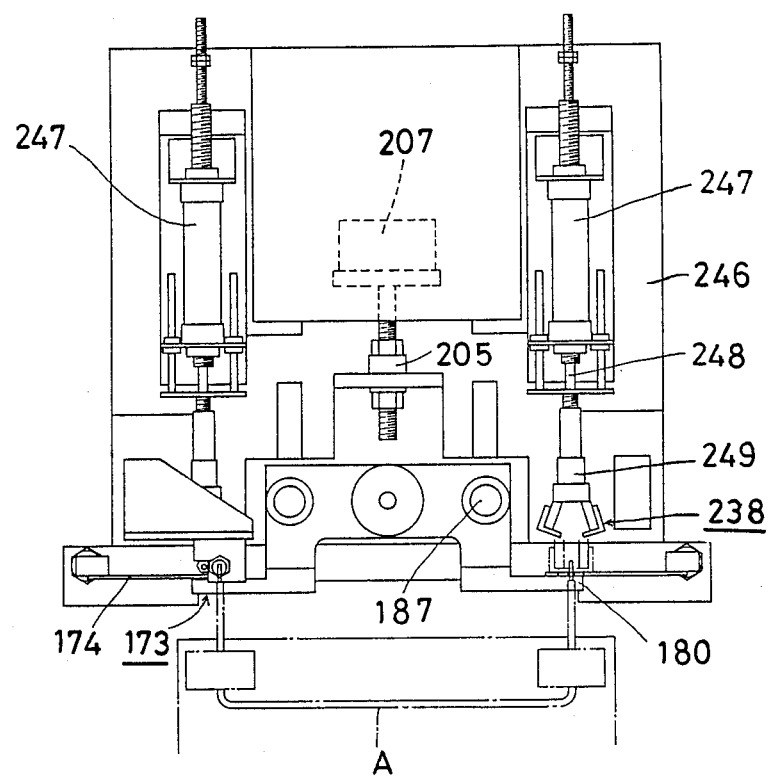
FIG. 46 is a plan view thereof.
Figure 47:
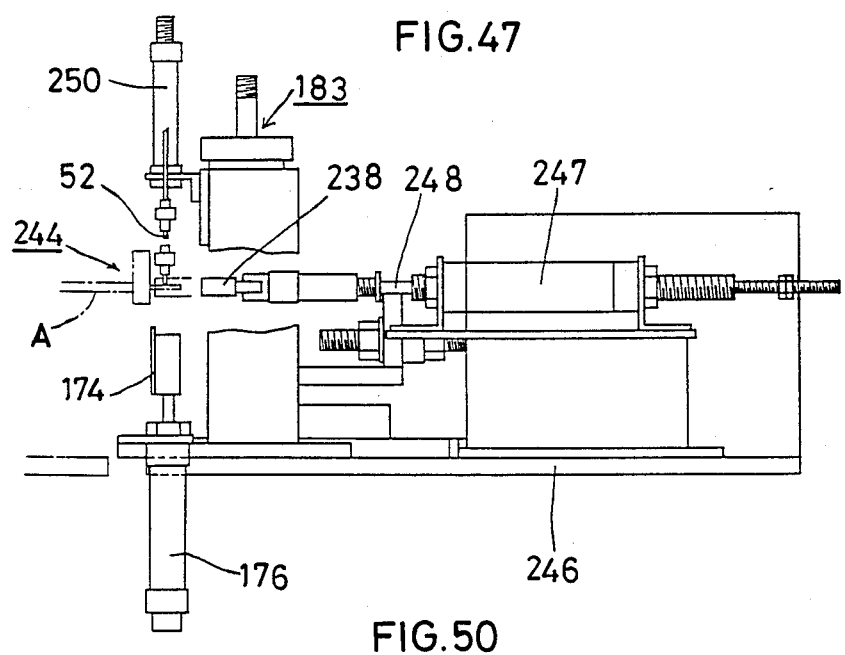
FIG. 47 is a side view of a portion thereof.
Figure 50:
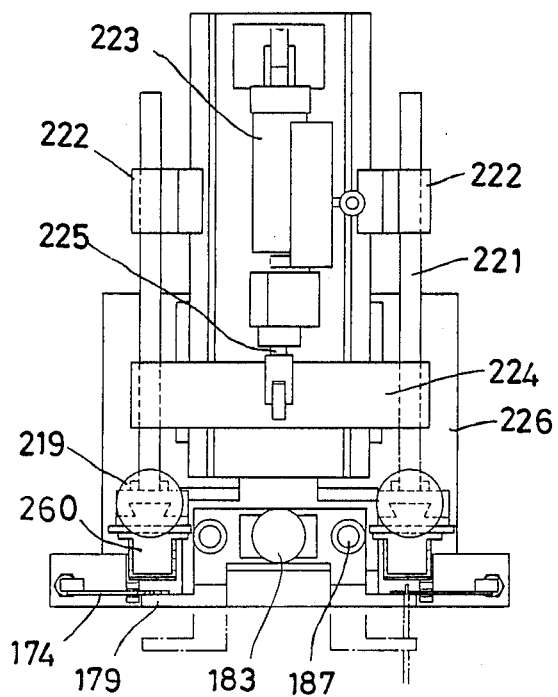
FIG. 50 is a plan view thereof.
Figure 48:
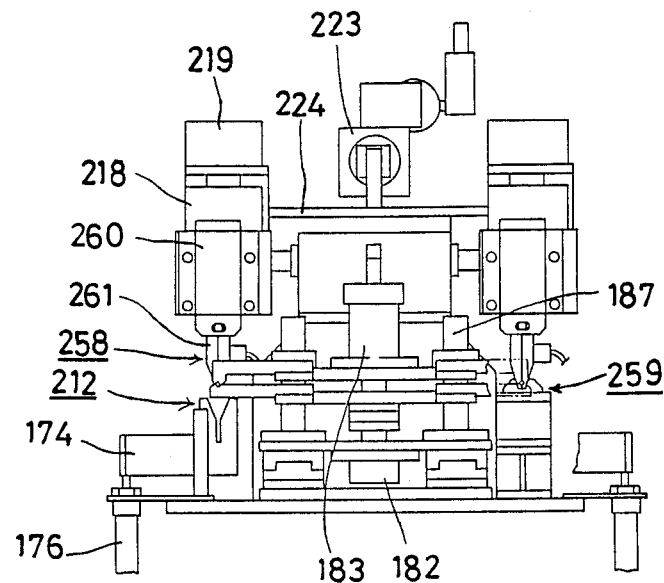
FIG. 48 is a front view of the ferrule mounting unit.

With the cable ends positioned properly, the air cylinder 247 is actuated (FIG. 46). The guide in its closed state will advance. Also, the air cylinder 250 lowers the adhesive nozzle 52. As shown in FIG. 44, the tension member 50 is folded back and the adhesive from the nozzle 52 is applied. Then the guide 238 is opened. This completes a series of adhesive applying steps. Now the positioning portion 244 and the adhesive applying portion 245 will go back to the original position.

[FERRULE MOUNTING UNIT]

Next, we shall describe the ferrule mounting unit 19 with reference to FIGS. 48–54. It consists generally of a cable end positioning unit 212, a ferrule chuck unit 258 and a ferrule supply unit 259. (FIG. 48) The positioning unit is the same as used in other units.

The ferrule mounting unit 18 is similar in construction to the spring mounting unit 16, but does not have an air nozzle. Also, it has an additional function for temporarily clamping the ferrule mounted on the cable end.

Figure 49:
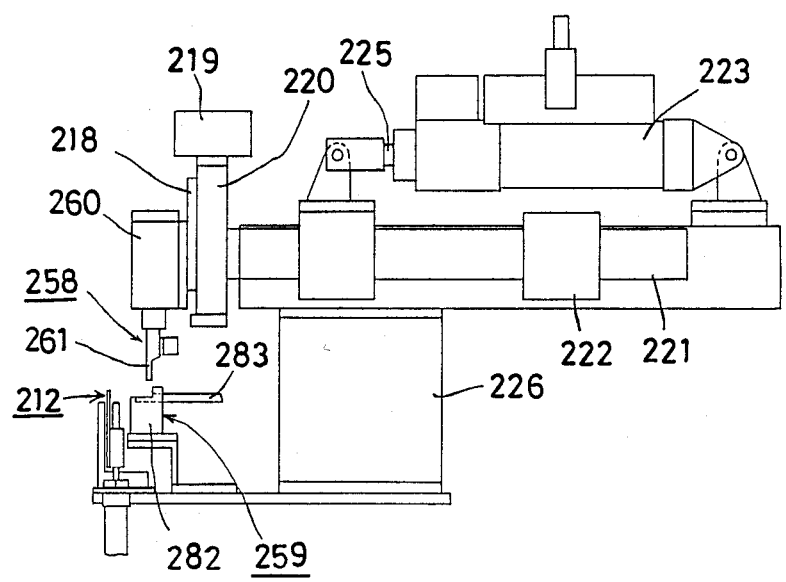
FIG. 49 is a side view thereof.
Figure 51:
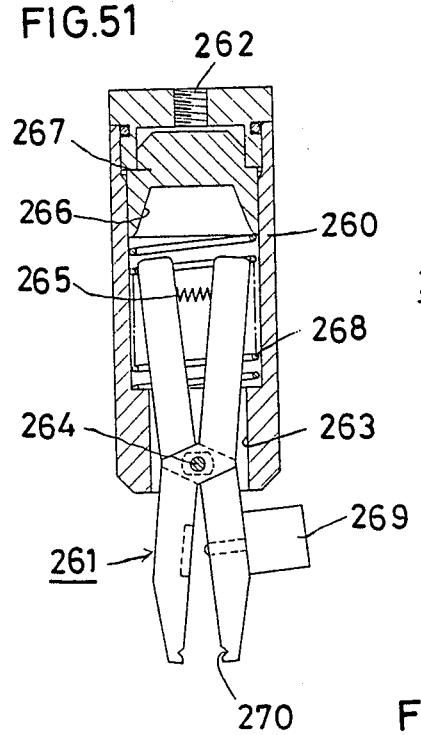
FIG. 51 is a sectional view of the ferrule chuck.

The ferrule chuck unit 258 is located slightly behind the positioning unit 212 (to the right in FIG. 49). The unit 258 has a pair of chuck claws 261 actuated by an air cylinder 260 (FIG. 51). The air cylinder is formed with a compressed air supply hole 262 at its top and with and opening 263 at its bottom. Scissors-like chuck claws 261 have their upper half received in the air cylinder 260 and their lower half projecting from the opening 263. The chuck claws 261 are mounted so as to be pivoted about an axis 264. A spring 265 is mounted between the upper halves of the chuck claws 261 to keep open the tips of the claws.

The air cylinder 260 has a piston 267 formed with a tapered hole 266. The piston is upwardly urged by a spring 268. When the piston 267 is pushed down by compressed air, the upper end of the chuck claw 261 fits in the tapered hole 266 in the piston. The pressure of compressed air determines how deep the upper end of the chuck claws 261 fit in the tapered hole and thus the clamping force of the chuck claws 261. The chuck claws are provided with a sensor 269 at their lower part to control the pressure of compressed air. The chuck claws are formed with a groove 270 for clamping and caulking the ferrule.

Figure 52:
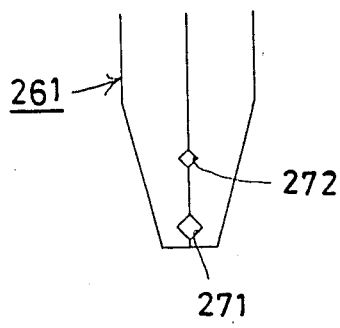
FIG. 52 is a front view of another example of the chuck.

FIG. 52 shows another example of the chuck claws which are formed with two grooves 271 and 272, one 271 for catching the ferrule and the other 272 for clamping it.

The air cylinder 260 is mounted on a slider 218 which is moved up and down by an air cylinder 219. (FIGS. 48 and 49) The air cylinder 219 and its supporting member 220 are mounted on a slider 221 moved back and forth by a cylinder 223 locked hydraulically.

A pair of sliders 221 are provided and coupled together by a coupler 224 which also couples them with a piston rod 225 of a cylinder 223. (FIG. 50) The sliders 221 are supported by a guide 222. The guide 222 and a cylinder 223 are coupled to a frame 226.

The ferrule supply unit 259 is provided under the ferrule chuck 258. A ferrule supply nozzle 283 is connected to a ferrule mount 282 secured to the frame 226. The ferrules are fed one after another from a ferrule supply unit (not shown).

In operation, the cable end positioning unit 212 positions the ends of the cable laterally and vertically in the same manner as described before with reference to FIGS. 35-37.

With the cable ends positioned, when the ferrule is supplied on to the ferrule mount 282 through the ferrule supply nozzle 283 (FIG. 49), the air cylinder 219 lowers the air cylinder 260 carrying the chuck claws 261. Then compressed air is supplied to the air cylinder 260 to lower the piston 267 (FIG. 51). When the upper portion of the chuck claws 261 fits in the tapered hole 266 in the piston 267 and closes, the ferrule is caught by the chuck claws in their groove 270. The chuck claws with the ferrule are raised to a position shown by a dotted line in FIG. 54 where the ferrule is aligned with the cable held by two claws 179, 180.

Figure 54:
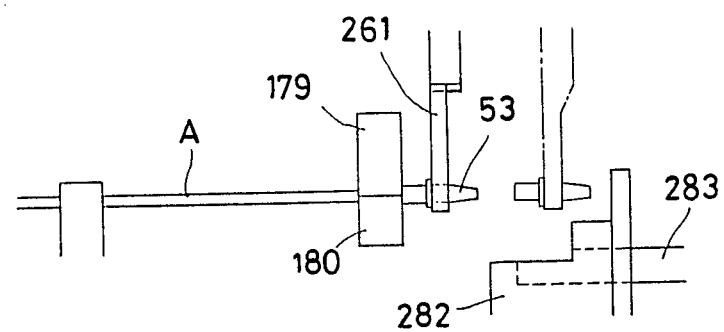

Then the cylinder 223 pushes the slider 221 forwardly to move the chuck claws 261 to position shown by a solid line in FIG. 54 so that the ferrule will be mounted on the core 51 of the cable to such an extent that it turns back the tension member 50 and completely covers it. Part of the adhesive applied beforehand is taken by the ferrule away from the cable end.

Now the pressure of compressed air supplied to the air cylinder 260 is increased. This increases the clamping force applied by the chuck claws 261 so that the ferrule is clamped temporarily to keep it in position. When the mounting and temporary clamping of the ferrule are completed, the positioning unit 212 and the ferrule chuck 258 will get back to their original state.

In case of the chuck claws 261 shown in FIG. 52, instead of increasing the clamping force of the chuck claws, the ferrule is caught firstly in the larger groove 271 and then clamped in the smaller groove 272.

Figure 53:
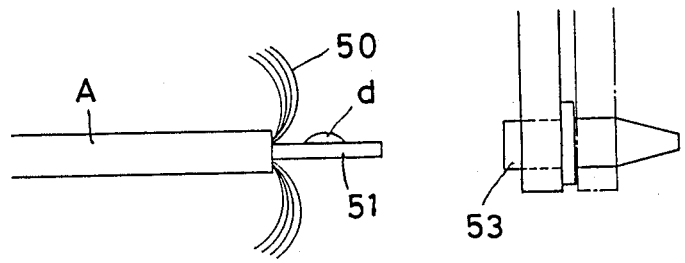
FIGS. 53 and 54 are views showing how the ferrule mounting unit operates to temporarily clamp the ferrule.

The ferrule may be clamped at the same one position thereof, or may be clamped at one position when mounting it on the cable and at another position when clamping it as shown in FIG. 53 by dotted line and solid line.

What are claimed are:

1. Process for automatically attaching a terminal to at least one end of a cable, comprising the steps of cutting the cable into predetermined lengths, coiling the cut pieces of the cable, stripping the sheath of the cable loop at said end to expose its core, mounting a spring on said end of the cable loop, applying an adhesive to the exposed core of the cable loop, mounting a terminal on the end of the cable loop, and clamping said terminal on the cable, all being done automatically, the stripping step and all other subsequent steps being done while the coiled cable loop laid down on a conveyor rack is conveyed intermittently from one step to another.

2. Apparatus for automatically attaching a terminal to at least one end of a cable, comprising:
   cutting means for cutting the cable into predetermined lengths,
   coiling means for coiling the cut pieces of the cable,
   transfer means for transferring the coiled cable loop to the next station,
   stripping means for stripping the sheath of the cable at end thereof to expose its core,
   spring mounting means for mounting a spring on said end of the cable loop,
   adhesive applying means for applying an adhesive to said end,
   terminal mounting means for mounting a terminal on said end of the cable loop,
   clamping means for clamping said terminal on the cable loop,
   conveyor means having a plurality of conveyor racks adapted to move intermittently carrying said cable loop from one means to another in turn among said stripping means, spring mounting means, adhesive applying means, terminal mounting means and clamping means, and
   disposed adjacent said transfer means for bringing down said cable loop on one of said conveyer racks while it is transferred by said transfer means from said coiling means to said conveyor means.

3. The apparatus as claimed in claim 2 wherein said last-mentioned means is an air nozzle.

* * * * *